United States Patent
Hofström et al.

(10) Patent No.: US 10,743,240 B2
(45) Date of Patent: Aug. 11, 2020

(54) METHODS, WIRELESS DEVICE AND RADIO NETWORK NODE FOR MANAGING INFORMATION ABOUT ONE OR MORE COVERAGE CLASSES ASSOCIATED WITH THE WIRELESS DEVICE

(71) Applicant: Telefonaktiebolaget LM Ericsson (publ), Stockholm (SE)

(72) Inventors: Björn Hofström, Linköping (SE); Jens Bergqvist, Linköping (SE); Birgitta Sagebrand, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 112 days.

(21) Appl. No.: 15/768,117

(22) PCT Filed: Nov. 10, 2016

(86) PCT No.: PCT/SE2016/051105
§ 371 (c)(1),
(2) Date: Apr. 13, 2018

(87) PCT Pub. No.: WO2017/082807
PCT Pub. Date: May 18, 2017

(65) Prior Publication Data
US 2018/0302845 A1    Oct. 18, 2018

Related U.S. Application Data

(60) Provisional application No. 62/253,302, filed on Nov. 10, 2015.

(51) Int. Cl.
*H04W 72/04* (2009.01)
*H04W 48/12* (2009.01)
(Continued)

(52) U.S. Cl.
CPC ............ *H04W 48/12* (2013.01); *H04W 8/24* (2013.01); *H04W 48/16* (2013.01);
(Continued)

(58) Field of Classification Search
None
See application file for complete search history.

(56) References Cited

U.S. PATENT DOCUMENTS 10,159,081 B2 * 12/2018 Martin ................ H04W 72/048
2009/0088158 A1 * 4/2009 Wang .................... H04W 76/19
455/436

(Continued)

OTHER PUBLICATIONS

Unknown, Author, "New Work Item on Extended Coverage GSM (EC-GSM) for support of Cellular Internet of Things", 3GPP TSG GERAN#67, GP-151039, Ericsson LM, Intel, Gemalto N.V., MediaTek Inc., TeliaSonera AB, Sierra Wireless S.A., Telit Communications S.p.A., Orange, Nokia Networks, Alcatel-Lucent; Yinchuan, P.R. China, Aug. 10-14, 2015, 7 pages.

(Continued)

*Primary Examiner* — Ajit Patel
(74) *Attorney, Agent, or Firm* — Sage Patent Group

(57) ABSTRACT

Methods, a wireless device (400; 120) and a radio network node (600; 110), for managing information about one or more coverage classes associated with the wireless device (400; 120). The wireless device (400; 120), sends, to the radio network node (600; 110) that receives, a message that comprises an indicator indicating an updated downlink coverage class estimated by the wireless device (400; 120).

12 Claims, 5 Drawing Sheets

(51) Int. Cl.
*H04W 76/25* (2018.01)
*H04W 8/24* (2009.01)
*H04W 48/16* (2009.01)
*H04W 72/08* (2009.01)

(52) U.S. Cl.
CPC ....... *H04W 72/048* (2013.01); *H04W 72/085* (2013.01); *H04W 76/25* (2018.02); *H04W 72/0413* (2013.01)

(56) References Cited

U.S. PATENT DOCUMENTS

| | | | | |
|---|---|---|---|---|
| 2009/0252103 A1* | 10/2009 | Harris | ............ | H04W 8/06 370/329 |
| 2009/0323634 A1* | 12/2009 | Kim | ............ | H04W 52/287 370/331 |
| 2013/0016696 A1* | 1/2013 | Adjakple | ............ | H04W 36/28 370/331 |
| 2013/0109386 A1* | 5/2013 | Pant | ............ | H04W 36/005 455/436 |
| 2014/0227997 A1* | 8/2014 | Kim | ............ | H04W 76/14 455/410 |
| 2015/0257124 A1* | 9/2015 | Karimli | ............ | H04W 64/006 455/436 |
| 2015/0296499 A1* | 10/2015 | Huang | ............ | H04W 72/048 370/329 |
| 2016/0242031 A1* | 8/2016 | Ojanen | ............ | H04W 28/16 |
| 2017/0188375 A1* | 6/2017 | Seo | ............ | H04W 72/02 |

OTHER PUBLICATIONS

3GPP, "3rd Generation Partnership Project; Technical Specification Group GSM/EDGE Radio Access Network; Cellular system support for ultra-low complexity and low throughput Internet of Things (CIoT) (Release 13)", 3GPP TR 45.820 V13.0.0, Aug. 2015, 1-495.

3GPP, "3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol", 3GPP TS 44.060 V12.5.0, Jun. 2015, 1-678.

Unknown, Author, "A Solution for LCS in GPRS, the BSS+ Protocol Architecture", 3GPP TSG GERAN #4, GP-010521, Biarritz, France, Apr. 2-6, 2001, 1-12.

Unknown, Author, "Core network assistance for paging devices in extended coverage", 3GPP TSGGERAN FS_IoT_LC Adhoc#2, GPC150288, Ericsson, Apr. 20-23, 2015, 1-4.

Unknown, Author, "Ready State DRX for Cellular IoT", 3GPP TSG GERAN, GPE150006, Stockholm, Sweden, Oct. 12-13, 2015, 1-11.

\* cited by examiner

METHODS, WIRELESS DEVICE AND RADIO NETWORK NODE FOR MANAGING INFORMATION ABOUT ONE OR MORE COVERAGE CLASSES ASSOCIATED WITH THE WIRELESS DEVICE

TECHNICAL FIELD

Embodiments herein relate to methods and arrangements in a wireless communication network, e.g. telecommunication network, for managing information about one or more coverage classes associated with a device.

BACKGROUND

Communication devices such as wireless communication devices, that simply may be named wireless devices, may also be known as e.g. User Equipments (UEs), mobile terminals, wireless terminals and/or Mobile Stations (MS). A wireless device is enabled to communicate wirelessly in a wireless communication network that typically is a cellular communications network, which may also be referred to as a wireless communication system, or radio communication system, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more Core Networks (CN), comprised within the wireless communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. a device that is not necessarily associated with a conventional user, such as a human, directly using the device.

The wireless device may be, for example, portable, pocket-storable, hand-held, computer-comprised, or vehicle-mounted mobile device, enabled to communicate voice and/or data, via the RAN, with another entity, such as another wireless device or a server.

The cellular communication network covers a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site provides radio coverage for one or more cells. A cell is thus associated with a geographical area where radio coverage for that cell is provided by the base station at the base station site. Cells may overlap so that several cells cover the same geographical area. By the base station providing or serving a cell is meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Special Mobile).

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices.

General Packet Radio Service (GPRS) is a packet oriented mobile data service on the 2G and 3G cellular communication system's global system for mobile communications (GSM).

Enhanced Data rates for GSM Evolution (EDGE) also known as Enhanced GPRS (EGPRS), or IMT Single Carrier (IMT-SC), or Enhanced Data rates for Global Evolution is a digital mobile phone technology that allows improved data transmission rates as a backward-compatible extension of GSM.

High Speed Packet Access (HSPA) is an amalgamation of two mobile telephony protocols, High Speed Downlink Packet Access (HSDPA) and High Speed Uplink Packet Access (HSUPA), defined by the 3rd Generation Partnership Project (3GPP), that extends and improves the performance of existing 3rd generation mobile telecommunication networks utilizing the WCDMA. Such networks may be named WCDMA/HSPA.

In 3GPP Long Term Evolution (LTE), which may be referred to as 4th generation or 4G, base stations, which may be referred to as eNodeBs or eNBs, may be directly connected to other base stations and may be directly connected to one or more core networks.

The 3GPP has undertaken to evolve further the UTRAN and GSM based radio access network technologies, for example into evolved UTRAN (E-UTRAN) used in LTE.

The expression downlink, which may be abbreviated DL, is used for the transmission path from the base station to the wireless device. The expression uplink, which may be abbreviated UL, is used for the transmission path in the opposite direction i.e. from the wireless device to the base station.

Machine Type of Communication (MTC) has in recent years, especially in the context of the Internet of Things (IoT), shown to be a growing market segment for cellular technologies, especially for GSM/EDGE with its more or less global coverage, ubiquitous connectivity and price competitive devices. Realization of IoT benefit from utilizing cellular technologies and GSM technology is of great, perhaps of greatest, interest to utilize at least initially. In general it is desirable to be able to (re)use existing wireless communication systems and cellular technologies for new type of devices such as MTC devices. An MTC device is typically a wireless device that is a self and/or automatically controlled unattended machine and that is typically not associated with an active human user in order to generate data traffic. A MTC device is typically much more simple, and associated with a more specific application or purpose, than and in contrast to a conventional mobile phone or smart phone. MTC involve communication to and/or from MTC devices, which communication typically is of quite different nature and with other requirements than communication associated with e.g. conventional mobile phones and smart phones. In the context of and growth of the IoT it is evidently so that MTC traffic will be increasing and thus needs to be increasingly supported in wireless communication systems.

Problems related to (re)using existing technologies and systems is e.g. that the requirements for the new type of devices typically is different than conventional requirements, e.g. regarding the type and amount of traffic, performance etc. Existing systems have not been developed with these new requirements in mind. Also, traffic generated by new type of devices will typically be in addition to conventional traffic already supported by an existing system, which existing traffic typically needs to continue to be supported by and in the system, preferably without any substantial disturbance and/or deterioration of already supported services and performance.

Any modifications need of existing systems and technology should of course be cost efficient, such as enabled by low complexity modifications, and preferably allowing legacy devices already being employed to continue to be used and co-exist with the new type of devices in one and the same wireless communication network.

Extended Coverage GSM (EC-GSM) is e.g. discussed in GP-151039, "New Work Item on Extended Coverage GSM (EC-GSM) for support of Cellular Internet of Things (CIoT_EC_GSM)", Ericsson L M, Intel, Gemalto N. V., MediaTek Inc., TeliaSonera AB, Sierra Wireless, S.A., Telit Communications S.p.A., ORANGE, Nokia Networks, Alcatel Lucent. Cellular Internet of Things (IoT), is e.g. discussed in 3GPP TR 45.820 V13.0.0, "Cellular System Support for Ultra Low Complexity and Low Throughput Internet of Things".

EC-GSM e.g. has the intention to improve coverage with 20 dB, to improve battery life time, keeping a minimum bitrate and to decrease device complexity. On the control channels the coverage is improved by for example using blind repetitions of radio blocks while on the data channels the coverage is improved using a combination of blind repetitions and Hybrid Automatic Repeat Request (HARQ) retransmissions of radio blocks.

One objective with EC-GSM is to be energy efficient to improve the battery life time in the devices, i.e. called mobile stations in GSM. One way of doing this is to reduce the amount of signaling between the mobile station and the network, especially reducing transmission from the mobile station since transmission in extended coverage using blind physical layer repetitions is very energy consuming.

When the mobile station accesses the network due to paging or due to data transmission, the mobile starts by transmitting an access request on the random access channel. The access request includes an estimate of the downlink coverage class as experienced by the mobile station at that time and also the access request allows the network to estimate a Timing Advance (TA) value to be used by the mobile station for uplink transmissions on an assigned Temporary Block Flow (TBF).

When the mobile station has released a TBF and entered a so called Ready State it monitors the access grant channel for a downlink assignment, from a BSS, in case of any downlink data arrival in the network and which data is targeted for the mobile station. During the Ready State the mobile station is known to the core network, in particular to the SGSN, on a cell level and can be reached by an access grant message directly instead of first being paged and then by transmitting an access request message to the network.

If data arrives in the network to be transmitted in the downlink, the mobile station will receive a downlink assignment message from the network, or in particular the BSS. Due to mobility and that tens of seconds may have passed since the latest uplink transmission occurred, the TA value assigned to the mobile station might be obsolete. The network has then the opportunity to request for a packet control acknowledgment message, sent as access bursts, giving the network an opportunity to estimate a new TA value.

SUMMARY

It is an object to alleviate or at least reduce one or more problems indicated herein. Hence, one object may is to provide one or more improvements in a wireless communication network, and that should be suitable when the wireless communication network supports EC-GSM.

A problem that has been identified is that, similar to the TA case discussed in the Background, in EC-GSM, information about the coverage class, in particular a downlink coverage class, may be or risk to be obsolete in certain situations, such as when a mobile station is in Ready State and it may be several, such as tens of, seconds since information about the coverage class was updated. Embodiments herein aim at improving this.

According to a first aspect of embodiments herein, the object is achieved by a method, performed by a device operative in a wireless communication network, for managing information about one or more coverage classes associated with the device. The device sends, to a network node comprised in the wireless communication network, a message that comprises an indicator indicating an updated downlink coverage class estimated by the device.

According to a second aspect of embodiments herein, the object is achieved by a computer program comprising instructions that when executed by a device causes the device to perform the first method according to the first aspect.

According to a third aspect of embodiments herein, the object is achieved by a computer readable medium comprising the computer program according to the second aspect.

According to a fourth aspect of embodiments herein, the object is achieved by a second method, performed by a network node comprised in a wireless communication network, for managing information about one or more coverage classes associated with a device. The network node receives, from the device, a message that comprises an indicator indicating an updated downlink coverage class estimated by the device.

According to a fifth aspect of embodiments herein, the object is achieved by a computer program comprising instructions that when executed by a network node causes the network node to perform the second method according to the fourth aspect.

According to a sixth aspect of embodiments herein, the object is achieved by a computer readable medium comprising the computer program according to the fifth aspect.

According to a seventh aspect of embodiments herein, the object is achieved by a device, operative in a wireless communication network, for managing information about one or more coverage classes associated with the device. The device is configured to send, to a network node comprised in the wireless communication network, a message that comprises an indicator indicating an updated downlink coverage class estimated by the device.

According to an eighth aspect of embodiments herein, the object is achieved by a network node, configured to be comprised in a wireless communication network, for managing information about one or more coverage classes associated with a device. The network node is configured to receive, from the device, a message that comprises an indicator indicating an updated downlink coverage class estimated by the device.

As should be realized, the radio network node is thanks to embodiments herein and the message that comprises the indicator indicating the updated downlink coverage class estimated by the device, enabled to update a downlink coverage class previously associated with the wireless device and that else would be used by the radio network node for downlink data targeted for the device. The identified problem can thereby be avoided which thus results in an improvement in a wireless communication network supporting EC-GSM. Hence, embodiments herein provide an improvement in a wireless communication network, and that is suitable when the wireless communication network supports EC-GSM.

BRIEF DESCRIPTION OF THE DRAWINGS

The various aspects of embodiments disclosed herein, including particular features and advantages thereof, will be readily understood from the following detailed description and the accompanying drawings, in which FIGS. 1-7 are shown.

FIG. 1 is a block diagram schematically depicting an example of a wireless communication network in which embodiments herein may be implemented.

FIG. 2 is a combined signaling diagram and flowchart for describing some embodiments herein.

FIG. 3 is a flowchart schematically illustrating embodiments of a first method according to embodiments herein.

FIG. 4 is a functional block diagram for illustrating embodiments of a device according to embodiments herein and how it can be configured to carry out the first method.

FIG. 5 is a flowchart schematically illustrating embodiments of a second method according to embodiments herein.

FIG. 6 is a functional block diagram for illustrating embodiments of a network node according to embodiments herein and how it can be configured to carry out the second method.

DETAILED DESCRIPTION

Figure 1:
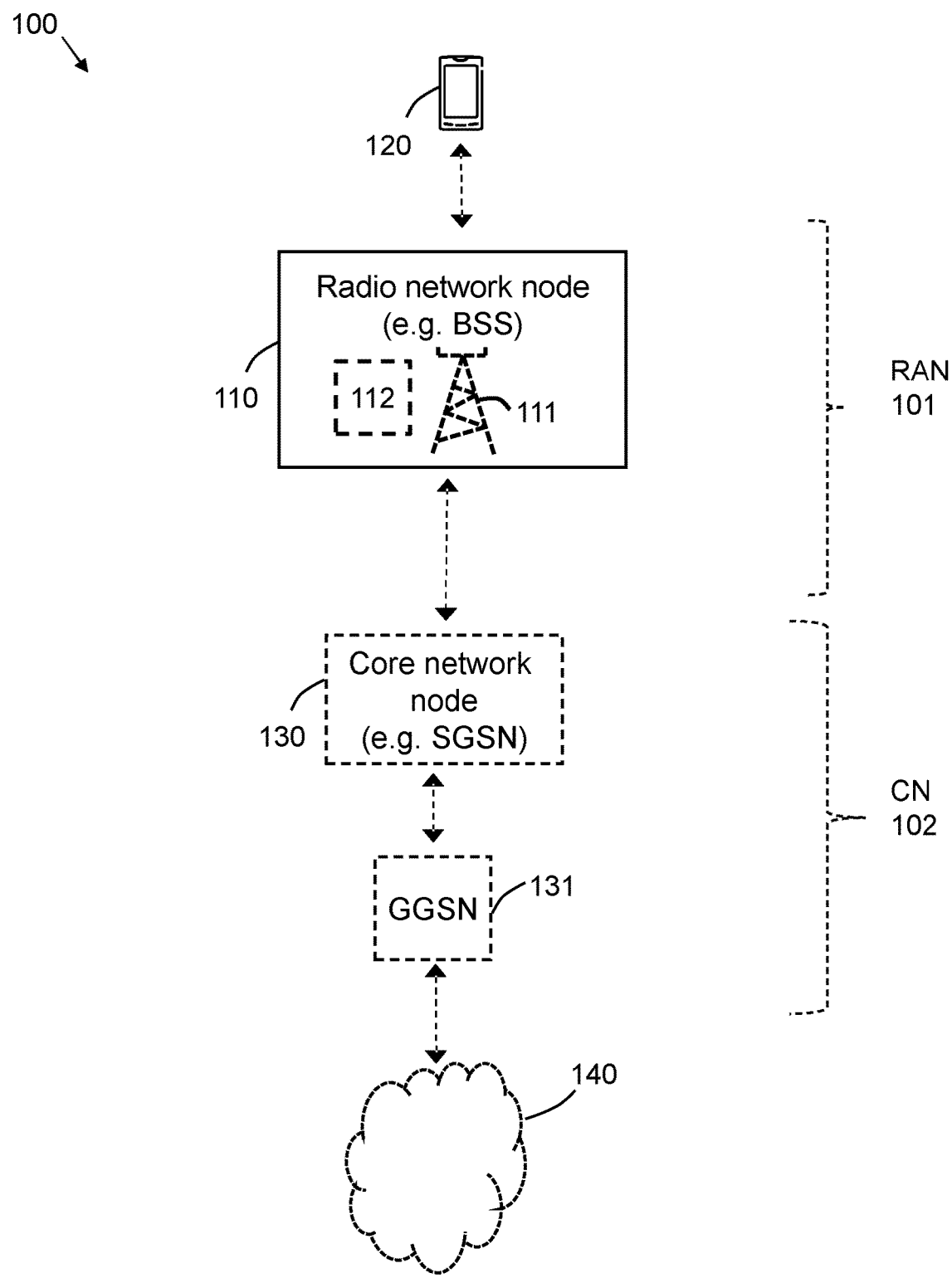

Throughout the following description similar reference numerals have been used to denote similar elements, units, modules, circuits, nodes, parts, items or features, when applicable. In the Figures, features that appear only in some embodiments are typically indicated by dashed lines.

In the following, embodiments herein are illustrated by exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

FIG. 1 is a schematic block diagram schematically depicting an example of a wireless communication network 100 in which embodiments herein may be implemented. The wireless communication network 100 is typically a telecommunication network or system, such as a cellular communication network that may be a GSM network or a GSM based communication network, and typically supports EC-GSM. It may comprise a RAN 101 part and a Core Network (CN) 102 part.

A radio network node 110 is shown comprised in the wireless communication network 100 and in the RAN 101. The radio network node 110 may be a radio network node as illustrated in the figure and may be or be comprised in a Base Station Subsystem (BSS), e.g. such supporting GSM/EDGE, for example when the when the wireless communication network 100 is a GSM network or a GSM based communication network. The radio network node 110 may be or comprise a base station 111, e.g. a Base Transceiver Station (BTS) of said BSS. The radio network node 110 may further comprise a controlling node 112 of a base station, which may control one or more base stations, including e.g. the base station 111, and may be a Base Station Controller (BSC) of said BSS.

The radio network node 110, or another network node, may serve and/or control and/or manage one or more wireless devices, e.g. MSs, such as a wireless device 120 shown in the figure, which are supported by and/or operative in the wireless communication network 100. The wireless device 120 may be of any type discussed herein, but is typically a MTC device and/or support EC-GSM and/or operate according to EC-GSM.

The wireless communication network 100 may support Extended Coverage GSM (EC-GSM). The wireless communication network then typically also support coverage classes that may be Coverage Classes (CCs) defined for EC-GSM. The coverage classes are associated with different coverage, such as different coverage extension, respectively.

As used herein, "coverage class" may refer to an ability of a device, e.g. the wireless device 120, to communicate with the wireless communication network from a certain location and/or under certain conditions. E.g. a first wireless device, e.g. the wireless device 120, supporting and/or assigned a first coverage class may be able to communicate with the wireless communication network operating according to the first coverage class from a certain location under certain conditions, while another, second wireless device (not shown) supporting and/or assigned another, second coverage class may not be able to communicate with the wireless communication network 100 operating according to the second coverage class, although the second wireless device is located at the same location and under the same conditions as the first wireless device, e.g. the wireless device 120.

The wireless device may be associated with, e.g. support or operate according to, one or more, typically one, or at least one at a time in the uplink and/or downlink, of said coverage classes that the wireless communication network supports.

Coverage classes of the downlink and uplink may not need to be the same, i.e. may be different.

Further, a core network node 130 may be comprised in the wireless communication network 100 and in the CN 101. The first core network node 130 may be a SGSN when the wireless communication network 100 is a GSM network or a GSM based communication network.

The wireless device 120 may communicate with and/or via the first core network node over a radio network node, e.g. the network node 110. The CN 102 may provide access for the wireless device to an external network 140, e.g. the Internet. The wireless device 120 may thus communicate via the RAN 101 and the CN 102 with the external network 140. When the wireless communication network 100 is a GSM network or a GSM based communication network, such as one supporting EC-GSM, the access to the external network is typically via a Gateway GPRS Support Node (GGSN), such as the GGSN 131 illustrated in the figure.

The wireless communication network 100, including relevant nodes thereof, e.g. the radio network node 110, and the wireless device 120, typically support, and/or are configured to operate according to, Extended Coverage GSM (EC-GSM).

Attention is drawn to that FIG. 1 is only schematic and for exemplifying purpose and that not everything shown in the figure may be required for all embodiments herein, as should be evident to the skilled person. Also, a wireless communication network or networks that in reality correspond(s) to the wireless communication network 100 will typically comprise several further network nodes, such as base stations, etc., as realized by the skilled person, but which are not shown herein for the sake of simplifying.

As a development towards embodiments herein, problems generally indicated in the Background will first be further elaborated upon.

A problem that has been identified is that, similar to the TA case discussed in the Background, in EC-GSM, information about the coverage class, in particular a downlink coverage class, may be or risk to be obsolete in certain situations, such as when a mobile station is in Ready State and it may be several, such as tens of, seconds since information about the coverage class was updated. Embodiments herein aim at improving this, which thus would result in an improvement in a wireless communication network supporting EC-GSM.

In EC-GSM, a mobile station, e.g. the wireless device 120, will estimate and report its downlink coverage class as experienced when measuring the Extended Coverage Common Control Channels Downlink (EC-CCCH/D) i.e. the Extended Coverage Broad Cast Channel (EC-BCCH) carrier. The resources assigned to the mobile station may then be allocated on a carrier different from the EC-BCCH carrier and therefore the downlink radio conditions experienced by the mobile station on the traffic channels might be different from that of the EC-BCCH carrier e.g. due to different interference levels.

A mobile station will stay in Ready State and monitor the access grant channel for as long as a ready timer is running, where the value of the timer is typically in the order of tens of seconds. If data arrives at the network for downlink transmission it will transmit the data using the latest downlink coverage class as assigned to the mobile station for downlink control 10 signalling during the last uplink TBF. This downlink coverage class value is based on the estimation done by the mobile station prior to the access request. This coverage class value may be obsolete since a mobile station is only required to report any increase in its coverage class (worse coverage) while monitoring the Extended Coverage Paging Channel (EC-PCH) and/or Extended Coverage Access Grant Channel (EC-AGCH). This will in turn lead to usage of unnecessary resources on the downlink. It would thus be an improvement if this could be avoided.

Figure 2:
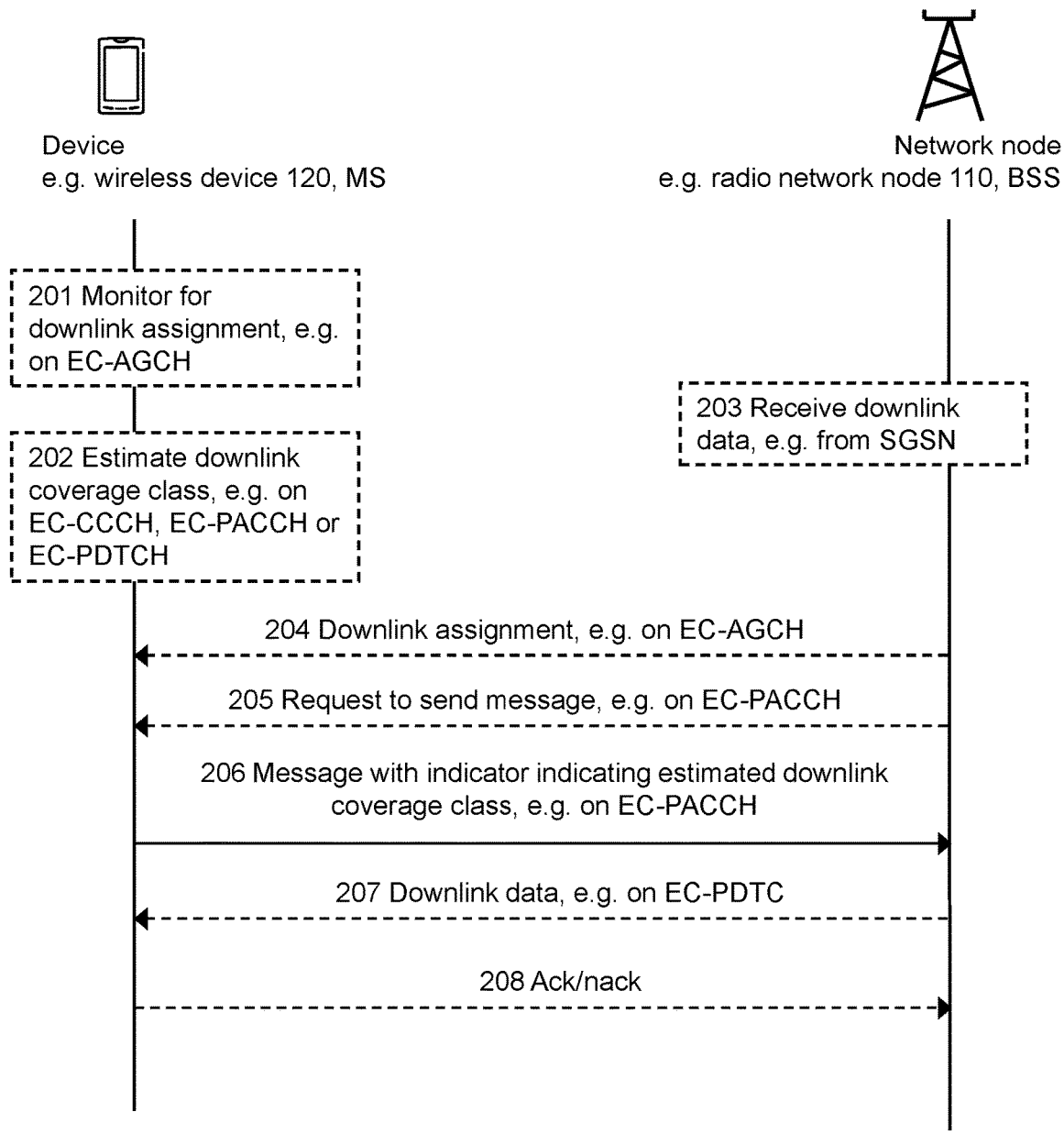

FIG. 2 depicts a combined signaling diagram and flowchart, which will be used to discuss embodiments herein, and with exemplifying details relating to GSM and EC-GSM. The involved nodes, as shown in the figure, is a device, in the following exemplified by the wireless device 120, and a network node comprised in a wireless communication network, in the following exemplified by the radio network node 110 and the wireless communication network 100.

The methods and actions discussed in the following are for managing information about one or more coverage classes associated with the wireless device 120.

The actions below may be taken in any suitable order and/or be carried out fully or partly overlapping in time when this is possible and suitable.

Action 201

The wireless device 120 may monitor a downlink assignment channel, e.g. a EC-AGCH, for a downlink assignment.

This action may thus correspond to the situation described above where a mobile station will stay in Ready State and monitor the access grant channel for as long as the ready timer is running.

Action 202

The wireless device 120 estimates a coverage class associated with the wireless device 120. It will be further discussed below when this estimation may be performed and on what, and how it may relate to other actions.

The estimation may be performed, e.g. by measuring, on a BCCH and/or EC-CCCH/D and/may be estimated when the device was last reading the BCCH and/or EC-CCCH/D, which may be prior to receipt of the request in Action 205 below, but may be later than when performing an estimation that resulted in a coverage class that the wireless device 120 last informed the wireless communication network 100 about and that thus typically is the coverage class that the wireless communication network 100 associates the wireless device 120 with prior to receiving the message in Action 206 below.

The estimation may alternatively or additionally be performed, e.g. by measuring, on a EC-PDTCH and/or EC-PACCH, which may be performed when and/or in response to receiving the request in Action 205.

Action 203

At some point in time, the radio network node 110 may receive downlink data targeted to the wireless communication device 120, e.g. from a SGSN, e.g. corresponding to the core network node 130.

Action 204

The radio network node 110 may send, to the wireless device 120 that may receive, a downlink assignment on said downlink assignment channel, e.g. EC-AGCH, being monitored according to Action 201, i.e. when receiving the downlink assignment the wireless device 120 may be in said Ready State monitoring the access grant channel.

Action 205

The radio network node 110 may send, to the wireless device 120 that may receive, a request, e.g. a poll, that requests the wireless device to send a message as described below under Action 206.

The request may have been sent by the radio network node 110 in response to that downlink data has arrived and is targeted for the device, i.e. may be in response to Action 203.

The request may be named packet polling request elsewhere herein.

The request may be received in response to that the wireless device 120 has received a downlink assignment, e.g. an assignment message comprising this downlink assignment, from the wireless communication network 120, e.g. the radio network node 110, such as in Action 204.

The downlink assignment in Action 204 may have informed the wireless device 120, prior to receipt of the request in the present action, that the request will be sent with a certain, e.g. one, higher coverage class than assigned for a download Temporary Block Flow (TBF), e.g. a presently valid TBF and/or TBF associated with the downlink assignment. The wireless device 120 may thus take this into account when receiving the request in the present action and the device may thereby, owing to the higher coverage class used, be able to be receive the request with a higher probability.

Alternatively, it may be predetermined that the request is always sent with a certain, such as one, higher coverage class, whereby the wireless device 120 will be able to know this without having to be informed about this in the downlink assignment.

The request and/or poll in the present action may be sent and received on a EC-PACCH.

Action 206

The wireless device 120 sends, to the radio network node 110 that receives, a message that comprises an indicator indicating, e.g. identifying, a coverage class associated with the device.

The indicated coverage class may be, or be based on, an estimate of the coverage class performed by the device, e.g. as performed in Action 202.

In some embodiments, said message is a message that enables, e.g. gives opportunity to, the network node to estimate Timing Advance (TA). The message may e.g. be a Packet Control Acknowledgement message that may be sent as access bursts.

In some embodiments, the message may correspond to, e.g. be or be comprised in, a Packet Downlink Ack/Nack message, such as in Action 207 below.

This messages enables the wireless device 120 to update the wireless communication network 100 about its coverage class, in particular its downlink coverage class. Doing this together with e.g. a message enabling the network to estimate TA means that existing signalling can be used, which facilitates implementation and reduce need for additional signalling.

The indicator may e.g. be realized by means of one, two or more, but typically only few, bits in said message. The message may be a slightly changed existing, e.g. conventional, or legacy, message, that e.g. may be changed by addition of information and/or (re)defining the meaning of one or a few bits already existing in the message or that are added to it.

The message may further comprise an identifier, or second indicator, that indicates, e.g. identifies, a channel that has been used for the estimation, e.g. a BCCH, EC-CCCH/D or EC-PACCH.

The indicated coverage class may be indicated by indicating a change of a coverage class previously associated with the device. The previously associated coverage class may be the coverage class that the device last informed the wireless communication network about. The previous coverage class may thus be the coverage class that the wireless communication network presently associates with the device, but which coverage class, as discussed above, may be obsolete.

In some embodiments, the message is sent in response to receipt of the request in Action 205.

Action 206 and/or Action 202 and/or Action 205 may be performed in response to and/or based on: that the wireless device 120 is in a ready state and/or that the wireless device 120 is monitoring said downlink assignment channel for downlink assignment, and/or that the wireless device 120 has received such downlink assignment, i.e. as in Action 204, and/or that the wireless device 120 has received an access grant on an access grant channel, and/or that a TBF associated with the wireless device 120 has been released. The downlink assignment channel and/or the access grant channel may be a EC-AGCH.

Action 206

As should be realized, the radio network node 110 may then send the downlink data, that may have been received such as in Action 204, to the wireless device 120. In the EC-GSM case this is typically done on an Extended Coverage Packet Data Traffic CHannel (EC-PDTCH).

Action 207

Further, as should be realized, the wireless device 120 may acknowledge or not the downlink data sent in Action 206, e.g. by sending a Packet Downlink Ack/Nack message, e.g. as mentioned above under Action 206.

Details about some embodiments, particularly in case of EC-GSM, will now follow.

When the network, e.g. the radio network node 110, such as BSS, receives downlink data, e.g. from the core network node 130, e.g. SGSN, i.e. such as in Action 203, it will may send a downlink assignment message on an Extended Coverage Access Grant CHannel (EC-AGCH) to the device, hereinafter exemplified by the wireless device 120, i.e. such as in Action 204. Given that the time elapsed since a last TBF could be in the order of tens of seconds, the network, hereinafter exemplified by the wireless communication network 100, may need to poll the device, i.e. such as in Action 205, on an Extended Coverage Packet Associated Control Channel (EC-PACCH) for a Packet Control Acknowledgment message to be able to estimate an up to date Timing Advance (TA) value to be used by the wireless device 120 for uplink transmission. In accordance with some embodiments herein, two bits or more in the Packet Control Acknowledgment message may be used to update, i.e. such as in Action 206, the wireless communication network 100 of the current downlink coverage class that may have been estimated by the wireless device 120, i.e. such as in Action 202, when last reading an Extended Coverage Common Control CHannels for the Downlink (EC-CCCH/D), e.g. prior to the reception of said message on the EC-AGCH, i.e. the EC-AGCH message.

As an alternative just one bit may be included in the Packet Control Acknowledgment message to signal a change in the estimated coverage class.

In some embodiments, the downlink coverage class estimation is performed by the wireless communication device 120, when reading a EC-PACCH Packet Polling Request message which is transmitted on the same radio resources as an Extended Coverage Packet Data Traffic CHannel (EC-PDTCH), typically for downlink data transfer. These radio resources may be different than a Broad Cast CHannel (BCCH) carrier where the EC-CCCH/D is located.

An addition for a mobile station, e.g. the wireless device 120, may be to include a bit in the packet control acknowledgment message, i.e. such as e.g. being sent in Action 206, to inform the wireless communication network 100 if the downlink coverage class estimation, i.e. such as in Action 202, has been performed on the BCCH carrier, e.g. EC-CCCH/D, or the EC-PACCH.

In some embodiments, the downlink coverage class estimation is included in the Packet Downlink Ack/Nack message, i.e. such as in Action 208. The estimation, i.e. as in Action 202, may then be performed on the EC-PDTCH and/or EC-PACCH, but it may also or alternatively be performed earlier on the BCCH carrier.

In some further embodiments, an assignment message, i.e. such as in Action 204, on the EC-AGCH includes information that the packet polling request control message, i.e. such as in Action 205, will be sent with a higher downlink coverage class than the one assigned for a downlink TBF that may be a current downlink TBF. The Packet Polling Request message, i.e. such as in Action 205, may be sent with a higher coverage class than the coverage class for downlink that previously used and may first be tried with.

The Packet Polling Request message, i.e. such as in Action 205, which typically is the initial transmission on a downlink TBF, may be to defined to always be sent with such higher coverage class.

The same change of coverage class may be applied for the Packet Control Acknowledgment message.

A device, e.g. the wireless device 120, such as a mobile station, can thanks to embodiments herein, update its network, e.g. the wireless communication network 100, with its current and thereby improved downlink coverage class and by this improve downlink resource utilization, reduce energy consumption in device and reduce latency of the downlink transfer.

Figure 3:
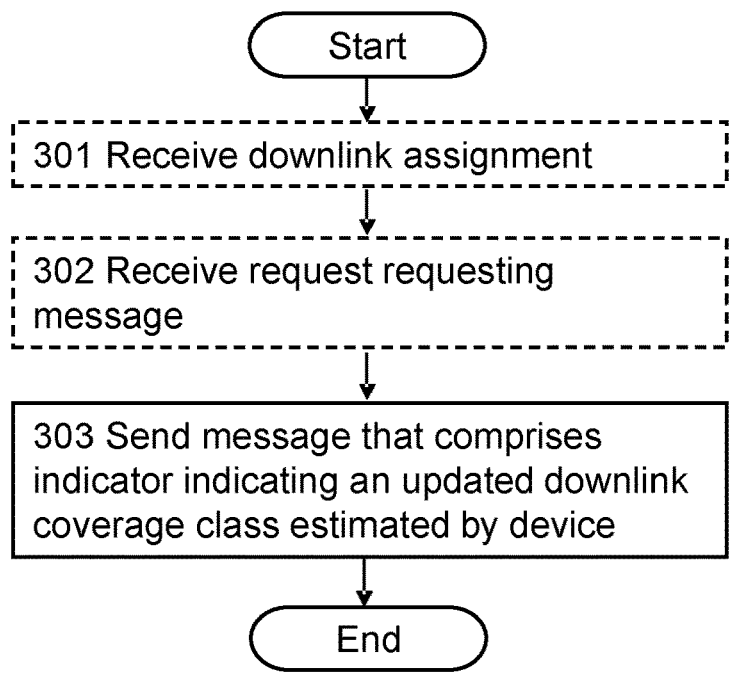

FIG. 3 is a flow chart schematically illustrating embodiments of a first method, performed by a device, exemplified by the wireless device 120 in the following, operative in a wireless communication network, exemplified by the wireless communication network 100 in the following. The first method is for managing information about one or more coverage classes associated with the wireless device 120. As already mentioned, the wireless communication network 120 may be a GSM network that may support EC-GSM, and said coverage classes may be Coverage Classes as defined for EC-GSM.

The first method comprises the following actions, which actions may be taken in any suitable order and/or be carried out fully or partly overlapping in time when this is possible and suitable.

Action 301

The wireless device 120 may receive a downlink assignment from a network node, exemplified by the radio network node 110 in the following, comprised in the wireless communication network 100. The downlink assignment may be received on a channel being monitored by the wireless device 120 for downlink assignment. The received downlink assignment may have been sent by the radio network node 110 in response to that the radio network node 110 has received downlink data targeted to the wireless device 120. As realized by the skilled person, the wireless device 120 may thus be in such Ready State as discussed herein when receiving the assignment.

This action may fully or partly correspond to action 204 as described above.

Action 302

The wireless device 120 may receive, from the radio network node 110, a request requesting the wireless device 120 to send a message as in Action 303 below. The request may have been sent by the radio network node 110 in response to that the radio network node 110 has received downlink data targeted to the wireless device 120, which downlink data may be the same as in Action 301.

This action may fully or partly correspond to Action 205 as described above.

Action 303

The wireless device 120 sends, to the radio network node 110, a message that comprises an indicator indicating an updated downlink coverage class estimated by the wireless device 120. As should be realized, the radio network node 110 is thereby enabled to update a downlink coverage class previously associated with the wireless device and that else would be used by the radio network node 110 for downlink data targeted for the device.

In embodiments where Action 302 is performed, the message is being sent in response to receipt of the request.

The message may be a message that also enables the wireless communication network 100 to estimate Timing Advance (TA) for the wireless device 120.

When the wireless communication network 120 is a GSM network, the message may be a Packet Control Acknowledgement message or a Packet Downlink Ack/Nack message.

This action may fully or partly correspond to action 206 as described above.

Figure 4:
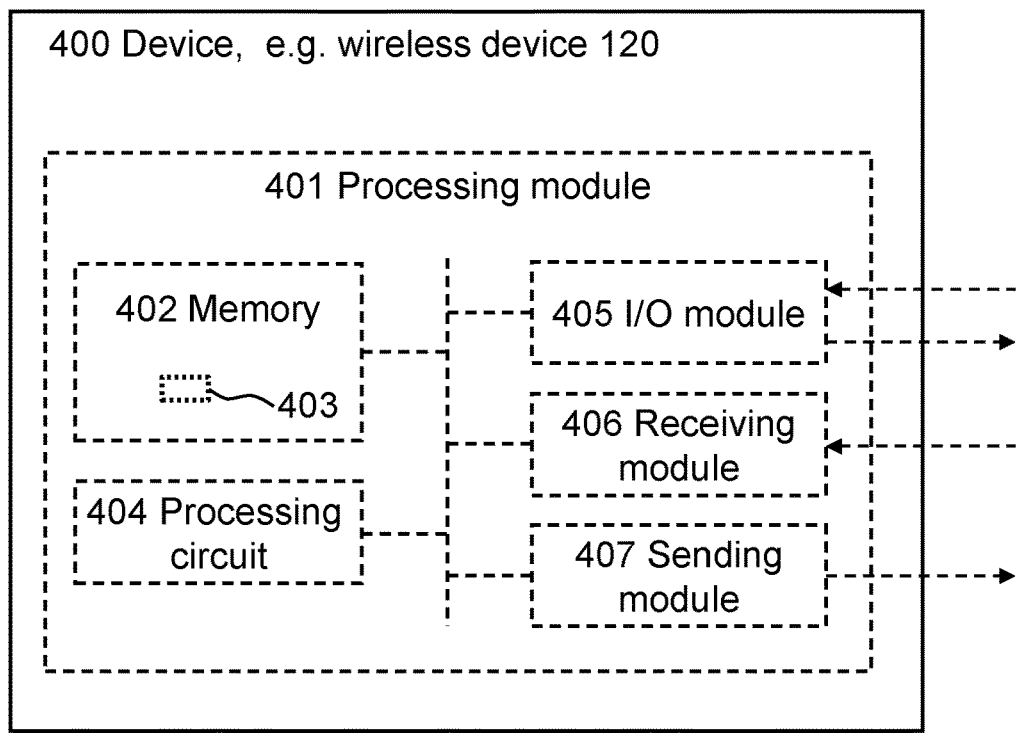

FIG. 4 is a schematic block diagram for illustrating embodiments of how a device 400, that may be the device discussed above, e.g. the wireless device 120, may be configured to perform the first method and actions described above, e.g. in connection with FIGS. 2 and 3. Hence, the device 400 may comprise one or more of the following:

A processing module 401, such as a means, one or more hardware modules, including e.g. one or more processors, and/or one or more software modules for performing said methods and/or actions.

A memory 402, which may comprise, such as contain or store, a computer program 403. The computer program 403 comprises 'instructions' or 'code' directly or indirectly executable by the device 400 so that it performs the said first method and/or actions. The memory 402 may comprise one or more memory units and may be further be arranged to store data, such as configurations and/or applications involved in or for performing functions and actions of embodiments herein.

A processing circuit 404 as an exemplifying hardware module and may comprise or correspond to one or more processors. In some embodiments, the processing module 401 may comprise, e.g. 'is embodied in the form of' or 'realized by' the processing circuit 404. In these embodiments, the memory 402 may comprise the computer program 403 executable by the processing circuit 404, whereby the device 400 comprising it is operative, or configured, to perform said first method and/or actions.

An Input/Output (I/O) module 405, configured to be involved in, e.g. by performing, any communication to and/or from other units and/or nodes, such as sending and/or receiving information to and/or from other external nodes or devices. The I/O module 405 may be exemplified by an obtaining, e.g. receiving, module and/or a sending module, when applicable.

The device 400 may also comprise other exemplifying hardware and/or software module(s), which module(s) may be fully or partly implemented by the processing circuit 404. For example, the device 400 may further comprise a receiving module 406 and/or a sending module 407.

The device 400 and/or the processing module 401 and/or the processing circuit 404 and/or the I/O module 405 and/or the sending module 407 are operative, or configured, to send, to said network node 600 comprised in the wireless communication network 100, said message, i.e. that comprises said indicator indicating the updated downlink coverage class estimated by the device 400.

In some embodiments, the device 400 and/or the processing module 401 and/or the processing circuit 404 and/or the I/O module 405 and/or the receiving module 406 are operative, or configured, to receive, from the network node 600, said request requesting the device 400 to send said message. The device 400 and/or the processing module 401 and/or the processing circuit 404 and/or the I/O module 405 and/or the sending module 407 may be operative, or configured, to send said message in response to receipt of this request.

In some embodiments, the device 400 and/or the processing module 401 and/or the processing circuit 404 and/or the I/O module 405 and/or the receiving module 406 are operative, or configured, to receive, from the network node 600, said downlink assignment on said channel being monitored by the device 400 for downlink assignment.

Figure 5:
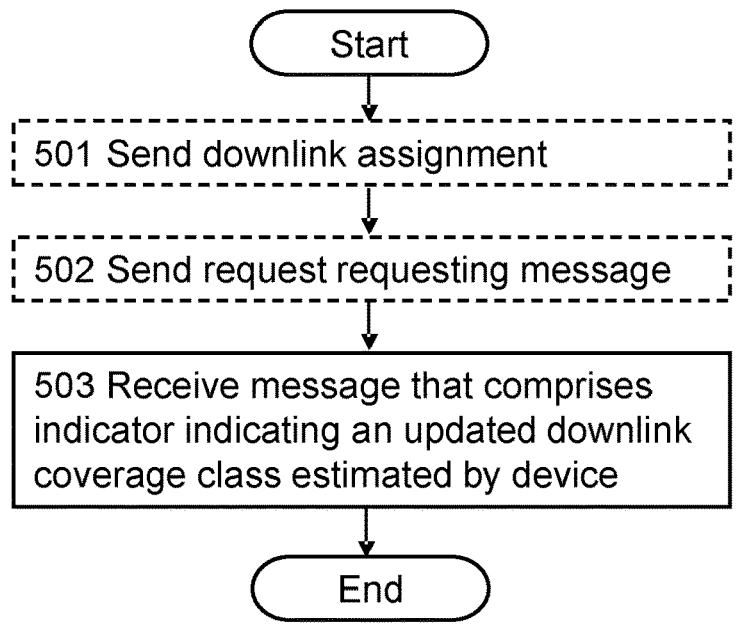

FIG. 5 is a flow chart schematically illustrating embodiments of a second method, performed by a network node, exemplified by the radio network node 110 in the following, comprised in a wireless communication network, exemplified by the wireless communication network 100 in the following. The second method is for managing information about one or more coverage classes associated with a device, exemplified by the wireless device 120 in the following. As already mentioned, the wireless communication network 100 may be a GSM network that may support EC-GSM, and said coverage classes may be Coverage Classes (CC) as defined for EC-GSM.

The second method comprises the following actions, which actions may be taken in any suitable order and/or be carried out fully or partly overlapping in time when this is possible and suitable.

Action 501

The radio network node 110 may send a downlink assignment to the wireless device 120. The downlink assignment may be sent on a channel being monitored by the wireless device 120 for downlink assignment. The downlink assignment may be sent by the radio network node 110 in response to that the radio network node 110 has received downlink data targeted to the wireless device 120.

This action may fully or partly correspond to action 204 as described above.

Action 502

The radio network node 110 may send, to the wireless device 120, a request requesting the wireless device 120 to send a message as in Action 503 below. The request may be sent by the radio network node 110 in response to that the radio network node 110 has received downlink data targeted to the wireless device 120, which downlink data may be the same as in Action 501.

This action may fully or partly correspond to Action 205 as described above.

Action 503

The radio network node 110 receives, from the wireless device 120, a message that comprises an indicator indicating an updated downlink coverage class estimated by the wireless device 120. As should be realized, the radio network node 110 is thereby enabled to update a downlink coverage class previously associated with the wireless device and that else would be used by the radio network node 110 for downlink data targeted for the device.

In embodiments where Action 502 is performed, the received message was sent by the wireless device 120 in response to receipt of the request.

The message may be a message that also enables the wireless communication network 100 to estimate Timing Advance (TA) for the wireless device 120.

When the wireless communication network 120 is a GSM network, the message may be a Packet Control Acknowledgement message or a Packet Downlink Ack/Nack message.

This action may fully or partly correspond to action 206 as described above.

Figure 6:
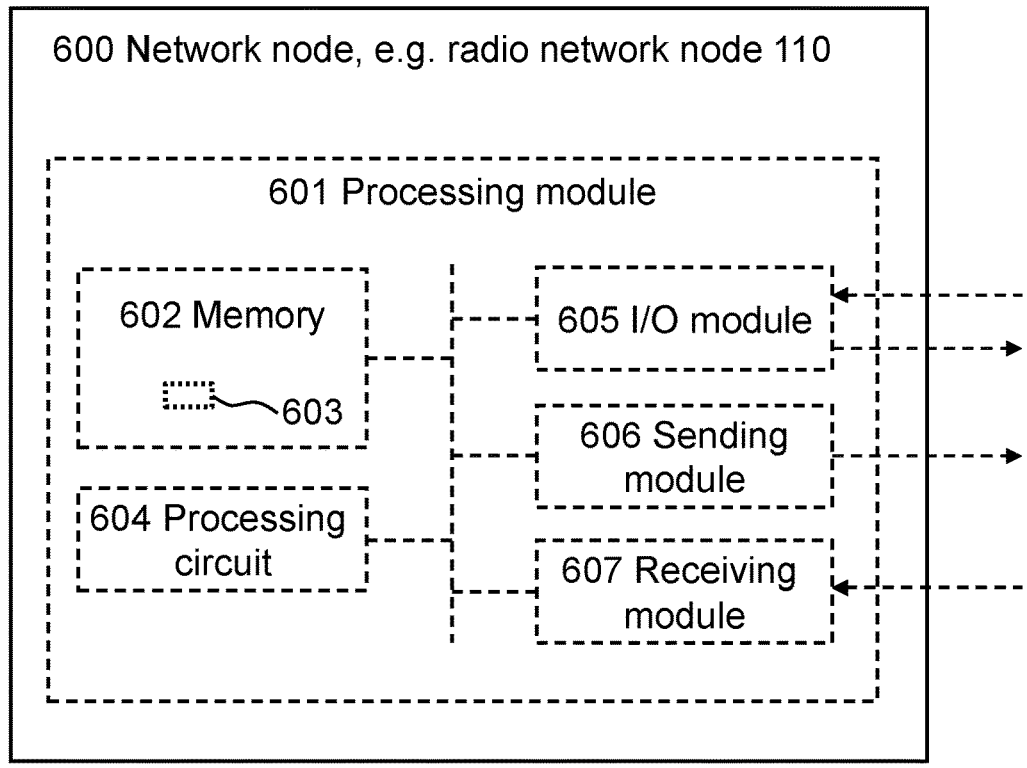

FIG. 6 is a schematic block diagram for illustrating embodiments of how a network node 600, that may be the network node discussed above, e.g. the radio network node 110, may be configured to perform the second method and actions described above, e.g. in connection with FIGS. 2 and 5. Hence, the network node 600 may comprise one or more of the following:

A processing module 601, such as a means, one or more hardware modules, including e.g. one or more processors, and/or one or more software modules for performing said methods and/or actions.

A memory 602, which may comprise, such as contain or store, a computer program 603. The computer program 603 comprises 'instructions' or 'code' directly or indirectly executable by the network node 600 so that it performs the said second method and/or actions. The memory 602 may comprise one or more memory units and may be further be arranged to store data, such as configurations and/or applications involved in or for performing functions and actions of embodiments herein.

A processing circuit 604 as an exemplifying hardware module and may comprise or correspond to one or more processors. In some embodiments, the processing module 601 may comprise, e.g. 'is embodied in the form of' or 'realized by' the processing circuit 604. In these embodiments, the memory 602 may comprise the computer program 603 executable by the processing circuit 604, whereby the network node 600 comprising it is operative, or configured, to perform said second method and/or actions.

An Input/Output (I/O) module 605, configured to be involved in, e.g. by performing, any communication to and/or from other units and/or nodes, such as sending and/or receiving information to and/or from other external nodes or devices. The I/O module 605 may be exemplified by an obtaining, e.g. receiving, module and/or a sending module, when applicable.

The network node 600 may also comprise other exemplifying hardware and/or software module(s), which module(s) may be fully or partly implemented by the processing circuit 604. For example, the network node 600 may further comprise a sending module 606 and/or a receiving module 607.

The network node 600 and/or the processing module 601 and/or the processing circuit 604 and/or the I/O module 605 and/or the receiving module 607 are operative, or configured, to receive, from the device 400, said message that comprises the indicator indicating the updated downlink coverage class estimated by the device 400.

In some embodiments, the network node 600 and/or the processing module 601 and/or the processing circuit 604 and/or the I/O module 605 and/or the sending module 606 are operative, or configured, to send, to the device 400, said request requesting the device 400 to send said message. The network node 600 and/or the processing module 601 and/or the processing circuit 604 and/or the I/O module 605 and/or the sending module 606 may be operative, or configured, to send the request in response to that the network node 600 has received said downlink data targeted to the device 400.

In some embodiments, the network node 600 and/or the processing module 601 and/or the processing circuit 604 and/or the I/O module 605 and/or the sending module 606 are further operative, or configured, to send, to the device 400 in response to that the network node 600 has received said downlink data targeted to the device 400, said downlink assignment on said channel being monitored by the device 400 for downlink assignment.

Figure 7A:
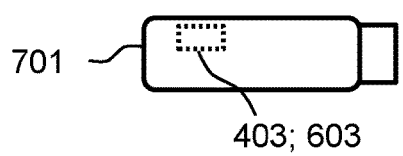
FIGS. 7a-c are schematic drawings illustrating embodiments relating to computer programs and computer readable media to cause the device and/or network node to perform the first method and/or second method, respectively.
Figure 7B:
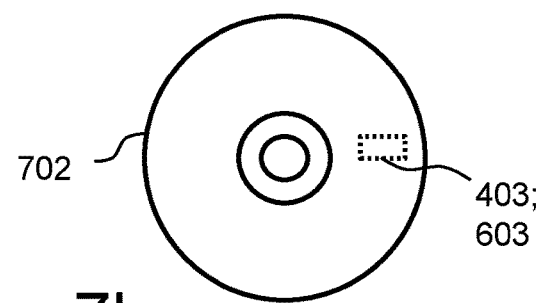
Figure 7C:
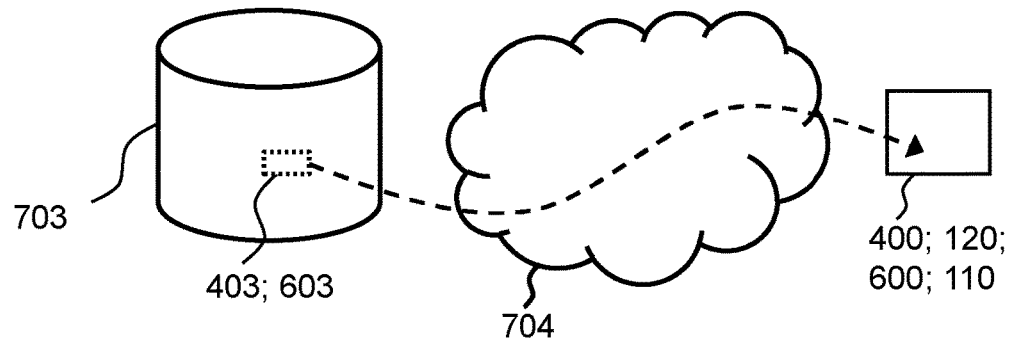

FIGS. 7a-c are schematic drawings illustrating embodiments relating to a computer program that may be any one of the computer programs 403 and 603, and that comprises instructions that when executed by the respective processing circuit 404, 604 causes the device 400 or network node 600 comprising it to perform the respective method as described above.

In some embodiments there is provided a computer program product, i.e. a data carrier, comprising a computer-readable medium and the computer program stored on the computer-readable medium. By computer readable medium may be excluded a transitory, propagating signal and the computer readable medium may correspondingly be named non-transitory computer readable medium. Non-limiting examples of the computer-readable medium is a memory card or a memory stick 701 as in FIG. 7a, a disc storage medium 702 such as a CD or DVD as in FIG. 7b, a mass storage device 703 as in FIG. 7c. The mass storage device 703 is typically based on hard drive(s) or Solid State Drive(s) (SSD). The mass storage device 703 may be such that is used for storing data accessible over a computer network 705, e.g. the Internet or a Local Area Network (LAN).

The computer programs 403, 603, respectively, may furthermore be provided as a pure computer program or comprised in a file or files. The file or files may be stored on the computer-readable medium and e.g. available through download e.g. over the computer network 705, such as from the mass storage device 703 via a server. The server may e.g. be a web or File Transfer Protocol (FTP) server. The file or files may e.g. be executable files for direct or indirect download to and execution on the device 400 and network node 600, respectively, for carrying out a method, e.g. by the processing circuits 404 and 604, respectively, or may be for intermediate download and compilation to make them executable before further download and execution causing the device 400 and/or network node 600 to perform the respective method as described above.

Note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the first node and the second node to be configured to and/or to perform the above-described methods, respectively.

Identification by any identifier herein may be implicit or explicit. The identification may be unique in the wireless communication network 100 or at least in a part or some area thereof.

The term "network node" as used herein may as such refer to any type of radio network node (described below) or any network node, which may communicate with at least a radio network node. Examples of such network nodes include any radio network node stated above, a core network node, Operations & Maintenance (O&M), Operations Support Systems (OSS), Self Organizing Network (SON) node, positioning node etc.

The term "radio network node" as used herein may as such refer to any type of network node serving a wireless device and/or that are connected to other network node(s) or network element(s) or any radio node from which a wireless device receives signals. Examples of radio network nodes are Node B, Base Station (BS), Multi-Standard Radio (MSR) node such as MSR BS, eNB, eNodeB, network controller, RNC, Base Station Controller (BSC), relay, donor node controlling relay, Base Transceiver Station (BTS), Access Point (AP), transmission points, transmission nodes, nodes in distributed antenna system (DAS) etc.

The term "wireless device" as used herein, may as such refer to any type of wireless device arranged to communicate with a radio network node in a wireless, cellular and/or mobile communication system, such as the wireless communication network 100, and may thus be referred to as a wireless communication device. Examples include: target devices, device to device UE, device for Machine Type of Communication (MTC), MTC device, machine type UE or UE capable of machine to machine (M2M) communication, Personal Digital Assistant (PDA), iPAD, Tablet, mobile terminals, smart phone, Laptop Embedded Equipment (LEE), Laptop Mounted Equipment (LME), Universal Serial Bus (USB) dongles etc. While said terms are used frequently herein for convenience, or in the context of examples involving other 3GPP nomenclature, it must be appreciated that the term as such is non-limiting and the teachings herein apply to essentially any type of wireless device.

The term "node" as used herein may as such refer to any type of network node or wireless device, such as described above.

Note that with regard to the downlink, the term "transmitter" may be used herein to refer to a radio network node, e.g. base station, and the term "receiver" may refer to a wireless device.

Note that although terminology used herein may be particularly associated with and/or exemplified by certain cellular communication systems, wireless communication networks etc., depending on terminology used, such as wireless communication networks based on 3GPP, this should as such not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that any enumerating terminology such as first network node, second network node, first base station, second base station, etc., that may have been used herein, as such should be considering non-limiting and the terminology as such does not imply a certain hierarchical relation.

Without any explicit information in the contrary, naming by enumeration should be considered merely a way of accomplishing different names.

The invention claimed is:

1. A method, performed by a device operative in a wireless communication network, for managing information about one or more coverage classes associated with the device, wherein the wireless communication network is a Global System for Mobile communication (GSM) network, supporting Extended Coverage GSM (EC-GSM) and the coverage classes are Coverage Classes (CC) as defined for EC-GSM, wherein the method comprises:

receiving, from a network node comprised in the wireless communication network, a request requesting the device to send a message that comprises an indicator indicating an updated downlink coverage class estimated by the device, wherein the message is a Packet Control Acknowledgement message or a Packet Downlink Ack/Nack message; and sending, in response to receipt of the request, the message to the network node.

2. The method as claimed in claim 1, wherein the request has been sent by the network node in response to the network node receiving downlink data targeted to the device.

3. The method as claimed in claim 2, wherein the method further comprises:

receiving, from the network node, a downlink assignment on a channel being monitored by the device for downlink assignment, wherein the downlink assignment has been sent by the network node in response to the network node receiving the downlink data targeted to the device.

4. The method as claimed in claim 1, wherein the message is a message enabling the wireless communication network to estimate a Timing Advance (TA) for the device.

5. A method, performed by a network node in a wireless communication network, for managing information about one or more coverage classes associated with a device, wherein the wireless communication network is a Global System for Mobile communication (GSM) network, supporting Extended Coverage GSM (EC-GSM) and the coverage classes are Coverage Classes (CC) as defined for EC-GSM, wherein the method comprises:

sending, to the device, a request requesting the device to send a message that comprises an indicator indicating an updated downlink coverage class estimated by the device, wherein the message is a Packet Control Acknowledgement message or a Packet Downlink Ack/ Nack message; and receiving, from the device, the message, wherein the received message was sent by the device in response to receipt of the request.

6. The method as claimed in claim 5, wherein the request is being sent in response to the network node receiving downlink data targeted to the device.

7. The method as claimed in claim 6, wherein the method further comprises:

sending, to the device in response to the network node receiving the downlink data targeted to the device, a downlink assignment on a channel being monitored by the device for downlink assignment.

8. The method as claimed in claim 5, wherein the message is a message enabling the wireless communication network to estimate a Timing Advance (TA) for the device.

9. A device, operative in a wireless communication network, configured for managing information about one or more coverage classes associated with the device, wherein the wireless communication network is a Global System for Mobile communication (GSM) network, supporting Extended Coverage GSM (EC-GSM) and the coverage classes are Coverage Classes (CC) as defined for EC-GSM, wherein the device comprises:

communication circuitry configured for communicating with network nodes in the wireless communication network; and processing circuitry operatively associated with the communication circuitry and configured to:

receive, from a network node comprised in the wireless communication network, a request requesting the device to send a message that comprises an indicator indicating an updated downlink coverage class estimated by the device, wherein the message is a Packet Control Acknowledgement message or a Packet Downlink Ack/Nack message; and send, in response to receipt of the request, the message to the network node in the wireless communication network, a message that comprises an indicator indicating an updated downlink coverage class estimated by the device.

10. The device, as claimed in claim 9, wherein the message is a message enabling the wireless communication network to estimate a Timing Advance (TA) for the device.

11. A network node in a wireless communication network, configured for managing information about one or more coverage classes associated with a device, wherein the wireless communication network is a Global System for Mobile communication (GSM) network, supporting Extended Coverage GSM (EC-GSM) and the coverage classes are Coverage Classes (CC) as defined for EC-GSM, wherein the network node comprises:

communication circuitry configured for communicating with devices; and processing circuitry operatively associated with the communication circuitry and configured to:

send, to the device, a request requesting the device to send a message that comprises an indicator indicating an updated downlink coverage class estimated by the device, wherein the message is a Packet Control Acknowledgement message or a Packet Downlink Ack/Nack message; and receive, from the device, the message, wherein the received message was sent by the device in response to receipt of the request that comprises an indicator indicating an updated downlink coverage class estimated by the device.

12. The network node as claimed in claim 11, wherein the message is a message enabling the wireless communication network to estimate a Timing Advance (TA) for the device.

* * * * *